June 7, 1927.
E. A. SEWARD ET AL
1,631,555
TERMINAL PROTECTIVE APPARATUS
Filed March 24, 1923
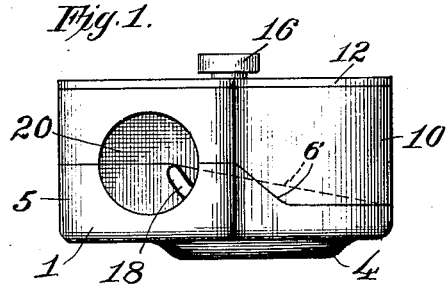
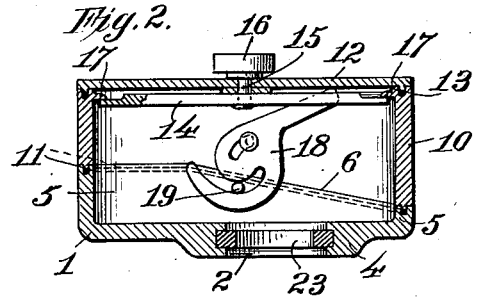
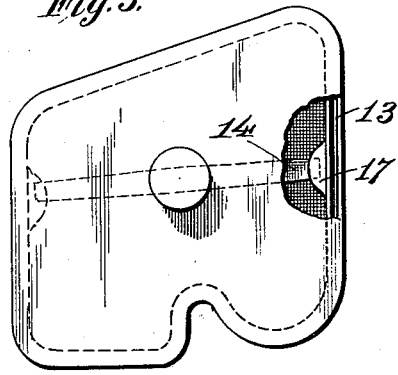
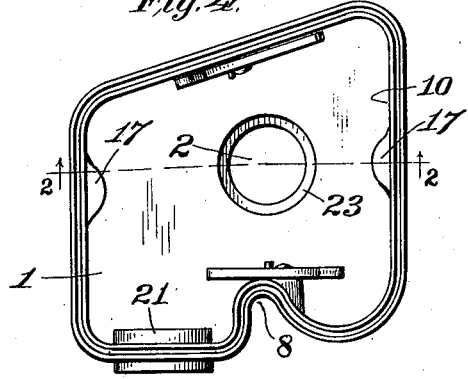
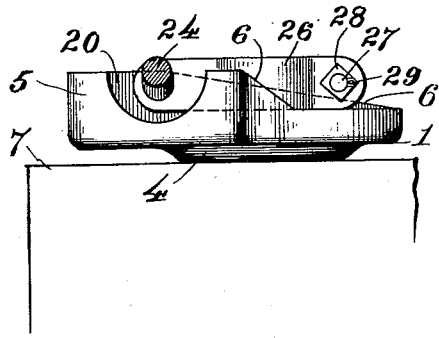
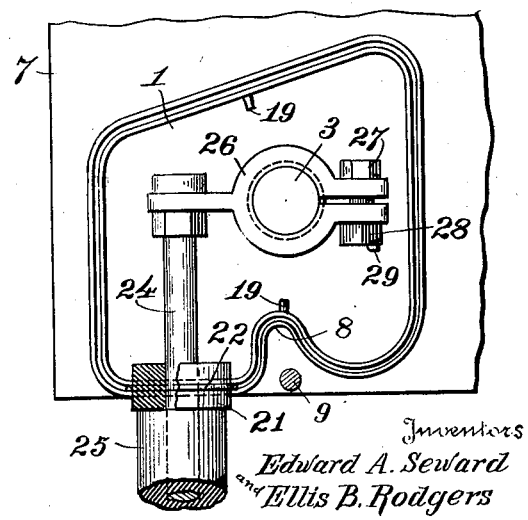
Inventors
Edward A. Seward
and Ellis B. Rodgers
By Edgar M. Kitchin
Attorney Patented June 7, 1927.

1,631,555

UNITED STATES PATENT OFFICE.

EDWARD A. SEWARD AND ELLIS B. RODGERS, OF COLUMBUS, GEORGIA.

TERMINAL PROTECTIVE APPARATUS.

Application filed March 24, 1923. Serial No. 627,503.

This invention relates to improvements in secondary battery terminal protecting apparatus, and has for its primary object the confining of the lubricant employed to prevent corrosion at such terminals.

A further object in view is the confining of such lubricant in such quantities as to assure the desired protection of the terminal while at the same time insuring against injury to the insulation of lead wire, or to the contents of the battery itself.

With these and further objects in view as will in part hereinafter become apparent and in part be stated, the invention comprises certain novel constructions, combinations and arrangements of parts as subsequently specified and claimed.

In the accompanying drawings,—

Figure 1 is an edge view of the structure embodying the features of the present invention, the insulating sleeve of the terminal lead being omitted.

Figure 2 is a vertical, central section taken therethrough, parts being seen in elevation.

Figure 3 is a top plan view thereof.

Figure 4 is a similar view with the cover plate removed.

Figure 5 is a view similar to Figure 4 with the casing wall also removed and the parts shown as applied on a battery, a fragment of the battery being shown.

Figure 6 is a view similar to Figure 1 of the parts as seen in Figure 5, the insulating sleeve of the lead being omitted.

As is well understood by those familiar with the conditions of service of secondary batteries such as are commonly used for the lighting and ignition systems of automobiles, difficulty is frequently experienced from the eating away of metal incident to the presence at the positive terminal of the battery of corrosive substance, such as copper sulphate, which forms at and about the positive terminal incident to the use of the battery. It has been found that a lubricated condition of the parts prevents, or largely tends to prevent, the formation of such corrosive substance and proportionally protects the battery terminal and its engaged lead, so that it has become quite common practice to apply vaseline on such terminal. This, however, has been found somewhat objectionable, both because the lubricant gradually finds its way into the fiber of the insulation of the lead and causes disintegration thereof and also in some instances finds its way into the battery cells and proportionally depreciates their value. Lubricant is also otherwise objectionable during the handling of the parts in dismantling and assembling incident to changing and recharging of the battery. The present invention is designed to largely overcome these difficulties by supplying a container for lubricant so constructed as to accommodate an ample quantity adequate for all protective purposes which is confined against access to the insulation of the terminal lead and prevented from spreading to other parts of the battery than the terminal itself.

Referring to the drawings by numerals, 1 indicates the base of such a container having preferably an opening 2 for the passage of the battery terminal 3, the passage 2 being surrounded by a downwardy-extending boss 4. The base 1 has an upstanding vertical wall 5 surrounding the margin of the base and of varying heights, according to conditions hereinafter set forth, that part of the wall at the left, as seen in Figure 2, being of considerable height, while that part at the right, as seen in said figure, being reduced to substantially a minimum, and being connected with the higher portions of the wall by inclined portions 6, 6, at what may be termed the ends of the container. The container of which the bottom 1 and sides 5 form parts may be of any contour required, according to the space and conditions provided by contiguous parts of the battery 7 on which the container is mounted. For example, at one place the container is indented, as indicated at 8, to accommodate an upstanding rod 9 from the battery, such, for example, as a part of the battery handle. It is, therefore, to be understood that the contour of the container is to be varied for adaptation to any particular battery, and the range of such variation is to be limited only by the extent of variations in the makes of secondary batteries.

Mounted on the upper edge of and coextensive with the wall 5 is a complemental casing or upstanding enclosing wall 10, which forms in fact a continuation of the wall 5, so as to complete the vertical wall portion of the container, the casing 10 and wall 5 being preferably connected by a tongue and groove formation at the meeting edges, as indicated at 11, and the casing 10 is of varying depths corresponding inversely to the variation in depths of the wall 5, so that the upper edge of the casing 10, lies in the same horizontal plane throughout. In other words, that portion of casing 10 at the right, as seen in Figure 2, is of as much greater depth than that portion of casing 10 at the left, as seen in Figure 2, as is the wall 5 higher at the left than it is at the right, so that the wall 5 and casing 10 together produce a container of substantially uniform depth, while at the same time leaving a shallow portion at the right hand side, as seen in Figure 2, when the casing 10 is removed, so that greater facility is provided for access to the parts as hereinafter mentioned.

Mounted on the upper edge of the casing 10 is a cover plate 12, which preferably connects with the upper edge of casing 10 by a tongue and groove construction 13, so that, when the parts are assembled as seen in Figure 2, a container results which is entirely closed and substantially sealed, or at least sufficiently so to prevent likelihood of any loss of lubricant from the container. The cover plate 12 is clamped or locked to the casing 10 by a turn-button 14 arranged at the under face of the plate 12 and having a shaft or pin 15 extending through the plate 12 and engaged at its upper end by a thumb nut 16 designed to be revolved for swinging the turn-button 14 to and from a locking position. The opposite sides of the casing 10, at its upper edge, are provided with inwardly-extending lugs or ledges 17, 17, adapted to be engaged, respectively, by the opposite end portions of the button 14, whereby revolution of the said button to the position indicated in Figures 2 and 3 will firmly lock the cover plate 12 onto the casing 10. Each end portion of button 14 is preferably inclined or beveled to cause the button to easily take under the lugs 17 and to then tighten against them as the button is further turned. To release the cover plate 12, so that it may be removed from casing 10, requires only a slight turn of the thumb nut 16 sufficient to move the ends of button 14 out of engagement with the camming ledges 17.

Pivoted to the sides of the casing 10 within the casing are eccentric levers 18, 18, with the long arm of the lever extending upward and the arcuate arm arranged below the pivot in position for engaging a pin 19 in each instance projecting inwardly from the inner face of the wall 5, whereby, when the levers 18 are swung to the position indicated in Figure 2, the casing 10 is firmly locked on the wall 5, and the presence of the cover plate 12, preventing the long arms of levers 18 from rising, will prevent release of the locking engagement of the camming or eccentric portions of levers 18 from engagement with pins 19. Hence, the parts 10 and 12 are effectively locked to the bottom portion 1 of the container during use, and are at the same time susceptible of ready disconnection, it being only necessary to remove the cover plate 12 to allow the operator to swing the levers 18 over to a position disengaged from pins 19, whereupon the casing 10 may be lifted off of the wall 5.

The container is formed with a laterally opening aperture 20 for the passage of the positive lead, the said aperture being preferably formed partly in the wall 5 and partly in the casing 10, and the curved edge of the material bounding the aperture 20 is grooved to correspond with the grooving of the tongue and groove connections 11 and 13. A sleeve 21 of preferably insulating material is arranged within the aperture 20 and is provided with an annular bead 22 fitting within the groove of the surrounding walls, as indicated clearly in Figure 5. An annulus 23 also preferably of insulating material is arranged within the aperture 2 and is preferably embedded in the material of the surrounding portion of boss 4, the opening in the annulus 23 being proportioned to exactly accommodate the passage of the standard or terminal 3 of the battery. The opening in the sleeve 21 is sufficient to just accommodate the passage of the conductor or lead 24 which is left bare within the container and just outside of the sleeve 21 the lead 24 is covered with the usual insulation 25. Any well known and appropriate binding, not shown, may be employed for the terminus of the insulation 25 so as to assure a snug fit against the exposed face of the sleeve 21. The terminal 3 is engaged by the usual clamp 26 retained by the clamping bolt 27 having a clamping nut 28 provided with appropriate locking apparatus 29, indicated in Figures 5 and 6, but not shown in detail. The lead 24 is bolted to an outstanding arm of the clamp 26 as is customary in battery construction.

The operation will be understood from the foregoing and may be briefly referred to. The base 1 is mounted on the terminal 3 before the clamp 26 is applied. The clamp 26 is then applied and the bolt 27 and nut 28 positioned for insuring effective contact. The lead 24 is then applied and clamped to the arm of the clamp 26, the sleeve 21 being already located on the strip portion of lead 24, and being positioned in that portion of the aperture 20 existing in the wall 5. When the parts have been thus far assembled, the casing 10 is applied and the levers 18 are swung over to the locking position seen in Figure 2. The container is then ready to receive the lubricant, and vaseline or other appropriate lubricant, preferably of the heavier type, is introduced, and the container may be practically filled with lubricant so as to insure against any portion of the positive terminal being left exposed and not lubricated. As soon as the container is applied, the cover plate 12 is applied and the thumb nut 16 is revolved until the plate is effectively clamped in place. The parts remain in this condition until it becomes necessary to recharge the battery or access to the positive terminal is required for any other reason. Thus it will be seen that while the parts are easily, quickly and readily assembled or dismantled, they are effective both in preventing the spreading of the lubricant to undesirable places and in retaining it where it is needed. The construction as described also serves to prevent accidental contact with the positive terminal and the resultant objectionable flashing of light as frequently occurs in the handling of batteries having exposed positive terminals. This latter protection is afforded by the use of the insulators 21 and 23.

The base 1, walls 5, casing 10, and cover plate 12 are preferably formed of sheet lead, but may, of course, be made of any appropriate material.

What is claimed is:—

1. A protective apparatus for the terminal of a secondary battery comprising a base adapted to surround the terminal, a casing removably mounted thereon, a cover for the casing, means for locking the casing onto the base, and means for locking the cover onto the casing in position for preventing release of the locking means for the casing to the base.

2. In protective apparatus for terminals of secondary batteries, the combination of a base adapted to have a battery terminal extend therethrough, the base being formed with upstanding walls, and a casing mounted edgewise on said walls to form therewith a lubricant container, the upstanding walls of the base being of greater height at certain points than at others, and the casing being conversely of greater width at the points where the upstanding walls of the base are lower for causing the upper edge of the casing to lie substantially in the same horizontal plane.

3. In protective apparatus for terminals of secondary batteries, the combination of a base adapted to have a battery terminal extend therethrough, the base being formed with upstanding walls, and a casing mounted edgewise on said walls to form therewith a lubricant container, the container being formed with a laterally opening aperture formed partly in the upstanding walls of the base and partly in the casing for accommodating the passage of the terminal lead, and a sleeve fitted within said laterally opening aperture for snugly receiving said lead.

4. In protective apparatus for terminals of secondary batteries, the combination of a base adapted to have a battery terminal extend therethrough, the base being formed with upstanding walls, a casing mounted edgewise on said walls to form therewith a lubricant container, the container being formed with a laterally opening aperture formed partly in the upstanding walls of the base and partly in the casing for accommodating the passage of the terminal lead, and the meeting edges of the casing and upstanding wall being formed with a tongue and groove connection, the margin of the laterally opening aperture being formed with a corresponding groove and an insulating sleeve arranged in said aperture and having an annular bead fitted in the last-named groove.

5. In protective apparatus for the terminals of secondary batteries, a container for lubricant adapted to be detachably mounted on the battery terminal, a cover plate for the container, a turn-button carried by the cover plate and extending within the container, the container having inwardly extending lugs adapted at times to be underlapped by the button, and a pin carrying the button and extending to the exterior of the cover plate for enabling manipulation of the button.

In testimony whereof we affix our signatures.

EDWARD A. SEWARD.
ELLIS B. RODGERS.